(12) United States Patent
Leonard

(10) Patent No.: US 8,347,315 B1
(45) Date of Patent: Jan. 1, 2013

(54) CONFIGURATION CONSOLE FOR MESSAGING MIDDLEWARE

(75) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 145 days.

(21) Appl. No.: 13/016,695

(22) Filed: Jan. 28, 2011

(51) Int. Cl.
*G06F 13/00* (2006.01)

(52) U.S. Cl. ...................... 719/313; 719/314; 707/999.1

(58) Field of Classification Search .................. 719/313, 719/314; 707/999.1
See application file for complete search history.

(56) References Cited

U.S. PATENT DOCUMENTS 7,124,134 B2 * 10/2006 Buzzeo et al. ........... 707/999.01
8,028,052 B2 * 9/2011 Larkin et al. ................... 709/223
2010/0115023 A1 * 5/2010 Peled ............................ 709/203

* cited by examiner

*Primary Examiner* — Andy Ho

(57) ABSTRACT

A method is provided comprising a server reading a first plurality of message queue objects associated with a first application transitioning from a first environment, reading a second plurality of objects associated with a baseline, and determining that a first time stamp associated with a first object in the first plurality is more recent than a second time stamp associated with the corresponding first object in the second plurality. The server reads approved changes, determines approval of the change to the first object, compares file names of objects in the first plurality with those of objects associated with the baseline, and determines that a name of a second object in the first plurality does not correspond to an object in the second plurality. The server determines that the placement of the second object in the first application is not approved, provides notification of need for approval and transitions the application.

20 Claims, 7 Drawing Sheets

CONFIGURATION CONSOLE FOR MESSAGING MIDDLEWARE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Middleware is computer software that provides a set of services that allows multiple processes running on one or more machines to interact. Middleware has evolved to provide for interoperability in support of a gradual shift to coherent distributed architectures, which may be used to support and simplify complex distributed applications. Middleware occupies a middle layer between application software that may be executing on different operating system platforms. Examples of middleware include enterprise application integration (EAI) software, transaction monitors, and message queue software. Middleware has gained popularity as a solution to problems of linking newer applications to older legacy systems. Middleware has also facilitated distributed processing, the connection of multiple applications to create a larger application, usually over a network. Middleware services provide a functional set of application programming interfaces that may allow an application to locate transparently across the network, thus providing interaction with another service or application. Middleware may support software developers avoid having to write application programming interfaces for every control program, by serving as an independent programming interface for their applications.

SUMMARY

In an embodiment, a processor-implemented method is provided. The method comprises a server identifying a first plurality of message queue objects associated with a first application transitioning from a first application environment and the server identifying a second plurality of message queue objects associated with a baseline environment. The method also comprises the server determining that a first time stamp associated with a first message queue object in the first plurality is more recent than a second time stamp associated with the corresponding first message queue object in the second plurality. The method also comprises the server reading a description of a plurality of approved changes and determining that the change to the first message queue object associated with the more recent time of the first time stamp has received approval. The method also comprises the server comparing names of message queue objects in the first plurality with names of message queue objects associated with the baseline environment. The method also comprises the server determining that a name of a second message queue object in the first plurality does not correspond to a message queue object in the second plurality. The method also comprises the server reading descriptions of approved changes and determining that the placement of the second message queue object in the first application has not received approval. The method also comprises the server sending notification to a development unit advising of need for approval of placement of the second message queue object in the first application. The method also comprises the server transitioning the first application from the first application environment.

In an embodiment, a processor-implemented method is provided. The method comprises a server identifying a first plurality of message queue objects associated with a first application transitioning from a first application environment to a second application environment wherein the second application environment is defined as an instance of a baseline configuration of the first application environment. The method also comprises the server identifying a second plurality of message queue objects associated with the baseline configuration. The method also comprises the server determining that a first time stamp associated with a first message queue object in the first plurality is more recent than a second time stamp associated with the first message queue object in the second plurality. The method also comprises the server accessing a description of a plurality of approved changes to determine whether the change to the first message queue object associated with the more recent time of the first time stamp is approved. The method also comprises the server determining that the change to the first message queue object is approved and transitioning the first application from the first application environment to the second application environment.

In an embodiment, a processor-implemented method is provided. The method comprises a server identifying a first plurality of message queue objects associated with a first application transitioning from a first application environment. The method also comprises the server identifying a second plurality of message queue objects associated with a baseline environment. The method also comprises the server comparing at least one of object names, object types, object timestamps, and object contents of message queue objects described in the first plurality with object names, object types, object timestamps, and object contents of message queue objects described in the second plurality. The method also comprises the server identifying a first variance, wherein the first variance comprises contents of a first object in the first plurality differing from the contents of the corresponding first object in the second plurality. The method also comprises the server identifying a second variance, wherein the second variance comprises a first object timestamp of a second object in the first plurality differing from a second object timestamp of the corresponding second object in the second plurality. The method also comprises the server identifying a third variance, wherein the third variance comprises a third object name in the first plurality not found in the second plurality. The method also comprises the server determining that the first variance is acceptable without further action and the server determining that the second variance is acceptable upon approval. The method also comprises the server determining that the third variance is unacceptable and the server transitioning the first application from the first application environment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description.

DETAILED DESCRIPTION

Figure 1:
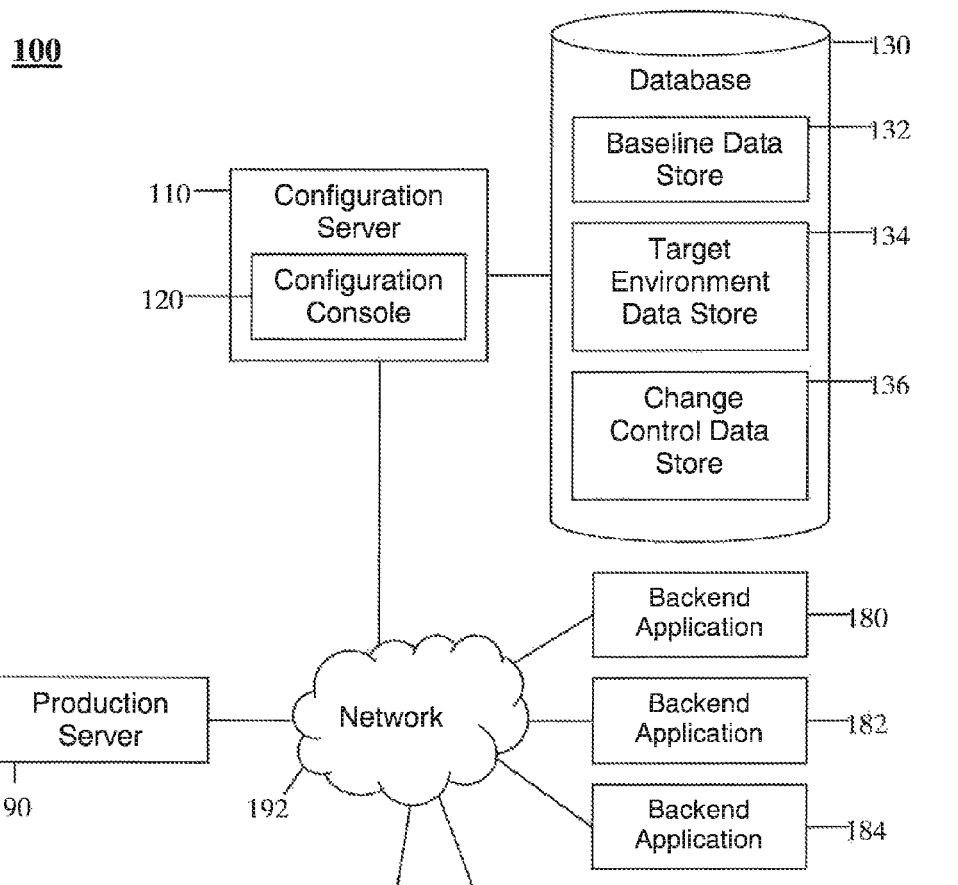
FIG. 1 is a block diagram of a system according to an embodiment of the disclosure.
Figure 1:
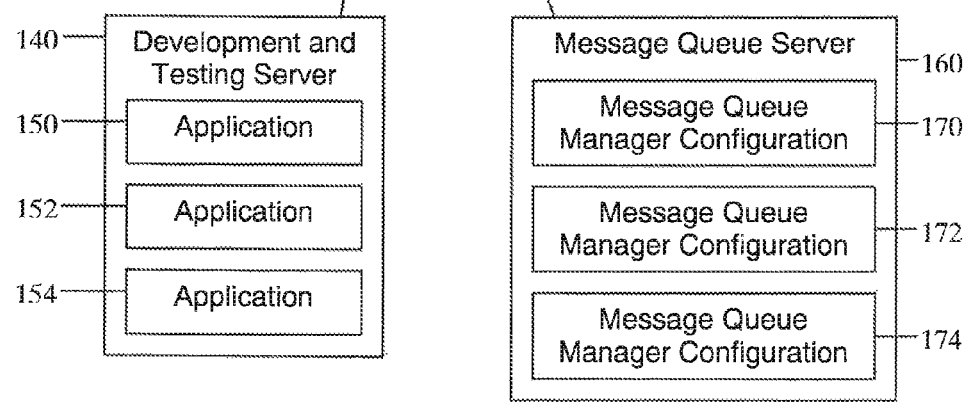

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that promote an organization developing software applications to monitor and manage message queue environments at a plurality of stages of development and testing. Message queue configuration changes introduced into development and testing environments may be captured and controlled with documented and approved changes receiving acceptance into the environments. Other changes may be identified, analyzed, and eventually included in or disallowed from message queue environments as applications progress toward release to production. As applications transition through various stages of development and testing, the system and methods taught herein promote the control of message queue environments, isolation of changes, tracking of permitted changes, and the maintenance of quality as applications are made ready for production.

An organization developing an application may establish at least one baseline message queue configuration that is a starting point and reference for configuration changes throughout the development cycle. As the application progresses through stages of development and testing, message queue settings may be changed in the environments through which the application passes depending on development and testing activities. The present disclosure teaches the identification of message queue configuration changes from the baseline and tracking of the approval status of the changes in a change control system. In addition to transitioning message queue configuration changes from source environments, applications may also be subject to prescribed message queue settings of destination or target environments. The system manages and accounts for message queue settings associated with both source and destination environments and endeavors to maintain message queue configuration correctness across the environments to support application consistency and quality and general fidelity and accountability back to the baseline.

The system and methods taught herein compare names, dates, and other information describing message queue objects associated with applications undergoing environment transition with the same information for the corresponding message queue in the baseline. When differences are found, the differences are analyzed to determine whether the changes in message queue objects are approved, candidates for approval, disallowed, or placed in another status. Approved changes may be permitted to migrate or transition to the next phase of development or testing. This may comprise changing configuration settings or parameters in the next phase. The system produces an output identifying the changes needed to migrate a message queue infrastructure from a source environment to the specified configuration for a destination environment. For example, a message queue infrastructure may migrate from a development or test source environment to a product integration destination environment. The system examines the baseline configuration, the entries in a configuration control database, a list of special configuration items in a target or destination environment and items specific to the application. The system examines the actual installation of the source message queue configuration associated with the transitioning environment prior to transition. It is the environment in which the application under development and testing executes that may change or transition. The system determines the changes that need to be made to comply with the baseline and approved changes and incorporate settings specific to the destination environment and the application itself.

Turning now to FIG. 1, a system 100 for a configuration console for messaging middleware is described. In an embodiment, the system 100 comprises a configuration server 110, a configuration console 120, a database 130, a development and testing server 140, applications 150, 152, 154, a message queue server 160, message queue manager configurations 170, 172, 174, backend applications 180, 182, 184, a production server 190, and a network 192. In some contexts, the configuration console 120 may be referred to as the console 120.

The configuration server 110 is a computer system. Computer systems are described in detail hereinafter. The configuration console 120 is a software application that executes on the configuration server 110. The configuration console 120 analyzes message queue manager configurations 170, 172, 174 of a plurality of development, test, and production environments. The configuration console 120 promotes transition from a source message queue environment to a destination message queue environment. This functionality may be applied to migrate from any environment to the designated successor environment. The configuration console 120 detects changes by developers, testers or others made in message queue manager configurations 170, 172, 174 of the application environments from baseline configurations, tracks approvals for changes, and flags unauthorized changes to be investigated and submitted for approval, modified, or removed. The configuration console 120 promotes correctness of message queue manager configurations 170, 172, 174 across environments and drives accountability for changes to configurations. The configuration console 120 accesses the database 130 that stores information about baseline or original configurations of development, test, and production environments. The configuration console 120 analyzes the message queue manager configurations 170, 172, 174 associated with applications 150, 152, 154 undergoing development and testing in various environments. Changes to message queue manager configurations 170, 172, 174 are detected by comparing message queue object definitions of applications that are migrating with message queue object definitions in the baseline environment. As applications 150, 152, 154 transition from one environment to the next toward production or between peer environments, for example parallel test environments, the configuration console 120 identifies changes in message queue objects that may not be documented or approved. The configuration console 120 may not permit an application 150 with message queue object configuration changes that have not been approved to be transitioned to the target environment.

An organization developing applications 150, 152, 154 may develop the applications 150, 152, 154 in a plurality of development environments. The organization may thereafter or concurrently test the applications 150, 152, 154 in a plurality of test environments. When the applications 150, 152, 154 are finalized and deemed ready for final release, the applications 150, 152, 154 may be placed into a production environment of which the production server 190 may be a component. Each of the environments may have its own configuration including hardware, operating system software, and networking configuration. Environments included in the discussion herein additionally comprise training environments and break-fix environments that may be created on a post-production basis.

Each of the environments described herein may also have message queue manager configurations 170, 172, 174 for handling messaging associated with applications 150, 152, 154 residing and executing in the environments. Message queuing may be used for the intake, storage, and forwarding of messages transmitted within and between applications 150, 152, 154 executing on one or more computers. Some message queues function internally, within a single instance of an operating system or application 150. Other implementations of message queuing pass messages between a plurality of computers and may involve multiple applications 150, 152, 154. When messages are passed between applications 150, 152, 154, message queuing software stores the incoming messages until the target or recipient application 150 connects with the message queuing server. A registered software routine may be called and the stored messages then may be released to the recipient application 150 for its processing.

While the discussion herein regarding applications transitioning environments while undergoing development and testing may suggest the physical movement of applications 150, 152, 154 from one server or collection of components to another, in an embodiment applications 150, 152, 154 undergoing transition through stages of development and testing may not physically move. Applications 150, 152, 154 may remain stationary in a server or cluster of servers and environments may be created around the applications 150, 152, 154 such that when the application 150 transitions from one environment to another, the application 150 is not physically moved or migrated. Rather, the existing environment in which the application 150 has been developed, tested, and/or executed is dismantled, disabled, or disconnected from the application 150 in some manner. The new or destination environment for the application 150 may then be created around the application 150 or otherwise associated with it. The environments may be created and modified in the development and testing server 140.

A large organization may be developing many different applications 150, 152, 154 at a time, each at various stages of development and/or testing. The applications 150, 152, 154 may be accessing different data stores or backend applications 180, 182, 184 at each stage. It may not make economic sense for the organization to unload applications 150, 152, 154 from one physical environment and reload the applications 150, 152, 154 in another physical environment. The organization may maintain software images of the application 150 at various stages of development and may load the images into various environments, each with different settings and subject to different development or testing scenarios. The present disclosure does not preclude embodiments comprising the physical movement or migration of applications from one environment to the next but also teaches embodiments comprising the transition of applications wherein the applications 150, 152, 154 remain stationary and environments, specifically those including message queue manager configurations 170, 172, 174, are created around the applications 150, 152, 154. The present disclosure additionally teaches combinations of various aspects of these embodiments.

The organization may wish to maintain control over the environments to assure integrity of applications 150, 152, 154 as they transition from development to test to production. When the environment in which an application 150 executes transitions from one to another, some or all configuration settings associated with the application 150 in the source environment may transition with the application 150 to the destination environment. The application 150, for example, may be a provisioning application or a customer care application. The message queue configuration settings are associated not with the application 150 but with the messaging middleware. These configuration settings associated with environments for transitioning applications 150, 152, 154 may include settings for the message queue manager configuration 170 in the source environment. The application 150 during its association with a first environment may have received one or more alterations that may have resulted in a message queue manager configuration change from the baseline configuration. The present disclosure teaches methods for identifying changes to message queue manager configurations 170, 172, 174 from baseline configurations, determining whether the changes are documented and approved, and carrying the changes across multiple successive environments where appropriate. Message queue manager configurations 170, 172, 174 may change from one development, testing, or other environment to the next as migrations occur because the tasks to be completed at each stage may differ. At an early development stage, tasks may comprise determining that application code merely executes as intended. At later stages when testing begins, tasks may include varying usage loads on the application code and the message queue manager configuration 170 in those environments. At latter stages of testing when application code has proven to withstand various usage loads, more realistic production scenarios may be introduced and message queue manager configurations 170, 172, 174 for those scenarios may be adjusted to reflect the conditions of these scenarios.

Changes to message queue manager configurations 170, 172, 174 that are not documented and approved for transition to successive or later message queue manager configurations 170, 172, 174 may be investigated. Such changes may arise from a development or testing group introducing the changes without documentation or approval. Such changes may have been introduced into the message queue manager configuration 170 in the current environment. Such changes may alternatively be associated with a previous environment wherein message queue configuration defects had been present but not apparent and had not become visible until the application 150 transitioned environments at least once. Whether a change to a message queue manager configuration 170 is legitimate and was overlooked by developers or testers, arose from an unseen defect in a current or previous version of the application 150 under development or testing, or is a result of some other action or event, the present disclosure teaches the identification of anomalous changes or differences in message queue manager configurations 170, 172, 174 and the resolution of the changes or differences in the context of authorized changes to the baseline established for the overall development project.

The organization developing the application 150 creates a single baseline environment as a starting point upon which to base creation of individual environments for use at various development and testing stages. The organization may mandate that changes to message queue manager configurations 170, 172, 174 associated with individual environments are to be accounted for and resolved back to the original single baseline environment. In an embodiment, from the single starting baseline environment, intermediate baseline application environments for one or more stages in a series of development, test, and production environments may be designed, if necessary. Information about these intermediate baseline environments may be stored in the baseline data store 132 in the database 130. Records of approved changes in a change control data store 136 enable the intermediate baseline environments to resolve back to the original baseline environment for the overall project.

A baseline environment represents a configuration comprising defined and trusted hardware, operating system, and other software configuration including a defined message queue manager configuration 170. The organization may create a modeled production baseline environment comprising hardware and software environment, including message queue manager configuration 170 in which the application 150 to be developed is envisioned to be placed once it is released. The organization may design application environments for various stages of development and testing based on the production baseline and may modify the environments to adjust for application requirements and other factors at each stage.

In an embodiment, the organization may use a single baseline environment for all stages including each of a plurality of successive or parallel development environments and testing environments. The organization may wish to track and document variations from baseline environments in the change control data store 136. The organization may permit and encourage justifiable variations between application environments along the progression of such environments from development to testing to production. However, to tightly manage the development process which includes maintaining integrity of applications 150, 152, 154 as they progress toward completion, the organization may seek to maintain correctness of application environments, such that while application environments may not be identical, they remain similar, and their differences may be justified and approved in the change control data store 136 stored in the database 130. When a single baseline environment for all stages is used, including each of a plurality of successive or parallel development environments and testing environments, standardized changes may be developed and permitted at various stages. These changes may be provided codes or other indicia and may be catalogued in and accessible from the change control data store 136 or elsewhere. In an embodiment, standardized changes may have various levels of approval associated with them such that some changes may be applied by nearly any developer or tester in most or all cases and other changes may be applied by only certain authorized parties.

The foregoing discussion about baseline application environments and their derivative environments as well as managing changes to the environments may apply to a plurality of aspects of an application environment, for example hardware, firmware, operating system software, and other software. The present disclosure is directed to message queue management software used in various application environments and managing changes to message queue software objects used in the message queue manager configurations 170, 172, 174. As the environments in which the application 150 is developed and tested change, some of the settings of the message queue management software supporting the application 150 may change for a plurality of reasons. Some message queue manager configuration settings may be unnecessary or may not matter when the application 150 is at one stage of development but may be important at a later stage or when the application 150 is undergoing testing using different stress or production scenarios.

The present disclosure teaches that message queue objects associated with the application 150 that is changing environments are compared with message queue objects in a baseline version of the application environment from which the application 150 is transitioning. The configuration console 120 discovers message queue objects associated with the transitioning application 150 that differ in version or date from their corresponding message queue objects in the baseline version. This may indicate that a message queue object was changed during the development, testing, or execution of the application 150 during the time the application 150 was in the environment from which it is transitioning. The configuration console 120 also discovers message queue objects associated with the transitioning application 150 wherein a corresponding message queue object cannot be found. This may suggest that a new message queue object was added, also prompting investigation. The present disclosure teaches the process of comparing message queue objects in a source environment with message queue objects in a baseline environment and identifying situations wherein message queue objects in the source environment may have changed while there or wherein new message queue objects were introduced into the environment. The system and methods taught herein capture such changes and determine whether changes to objects are immaterial and may be permitted without further action, have been documented and are approved, have been documented and await approval, or are undocumented and may need to be investigated and possibly removed.

When the application 150 is transitioning from a first environment to a second environment, this may entail transitioning from a first message queue environment to a second message queue environment. These environments are represented herein as message queue manager configurations 170, 172, 174 that may be stored in the message queue server 160. As noted, this may entail the dismantling, disconnection, or other removal of the environment, including message queue manager configuration 170, from the application 150 being transitioned. The replacement or new environment may be created for or otherwise associated with the application 150. Before the application 150 may be transitioned, any settings for the message queue manager configuration 170 for the application 150 in the source environment that vary from a baseline configuration may be determined. The baseline configuration may be the standard baseline environment provided for the entire project or it may be a modified baseline environment, with the modifications known and documented.

The configuration console 120 may begin by creating a first list of message queue objects associated with the application 150 being transitioned. This may comprise the entire message queue manager configuration 170 for the application 150. The first list may include object name, object type, create date, and alter date, if applicable, for each of the message queue objects associated with the transitioning application 150. The configuration console 120 then similarly creates a second list of message queue objects associated with the baseline environment. These are known message queue objects associated with an established and relied-upon message queue environment. This information may be stored in the baseline data store 132 in the database 130. The configuration console 120 then compares the first list and the second list, a process that may identify differences between objects described in the lists. The configuration console 120 may examine timestamps associated with the message queue objects associated with the transitioning application 150 and the baseline. When the configuration console 120 performs this comparison, it may determine if creation dates or alteration dates for the message queue objects in the first list for the transitioning application 150 are more recent than the date of the corresponding message queue object in the second list describing baseline objects. When the creation or alteration date for a message queue object in the first list is more recent than the date for the same message queue object described in the second list, this indicates that the message queue object has been modified in some manner since the baseline environment was created.

The configuration console 120 may create a change list describing message queue objects with creation or alteration dates more recent than dates of the same message queue objects in the baseline environment. The change list may also describe message queue objects that appear in the first list but do not appear in the second list, indicating newly created or renamed objects. These types of message queue objects may be equally or more important than objects that have the same name as previously but have been altered in some manner. The change list created by the configuration console 120 comprises message queue objects that have been modified, newly created, or renamed since the baseline date. The change list may also comprise the queue manager name with which the listed message queue objects are associated.

The configuration console 120 then accesses the complete object definition for each message queue object in the change list to determine what has changed with each object since the baseline date. The configuration console 120 may also query the database 130 for information about a target or destination environment for the application being developed and/or tested. As noted, the application 150 under development or testing may not be physically moving and instead, a target, destination, or new message queue manager configuration 170, 172, 174 may be extracted from the message queue server 160 and built around the transitioning application 150 along with other environmental information. The configuration console 120 may examine the object definition for each message queue object in the change list to determine how the object changed from the version of the object in the baseline environment. When the at least one change is determined, the configuration console 120 may query the database 130 to determine if the change is approved. The configuration console 120 records its findings about discrepancies between the objects in the change list. Some changes may be found in the database 130 to have been fully documented and approved, other changes may be documented but not yet approved, yet other changes may not be documented at all. The latter two categories may warrant further analysis and may cause the transition of the application 150 to its destination environment to be delayed or cancelled.

Some changes between versions of message queue objects may be deemed not material or not relevant to the overall message queue manager configuration 170 of the application 150 or the environments in which the applications 150, 152, 154 are developed and tested. The present disclosure teaches that the application environments need not be identical to each other, such that while there are differences between the environments, the differences may not be material. When there are material differences, those differences are tracked, accounted for, and when necessary, resolved as described herein. For example, in a development environment, an attribute value provided to a message queue object such as transmit queue maximum depth may not be relevant so the difference between an attribute value for this object in a development environment and a test environment may not be important. However, from one testing environment to the next, the differences between the attribute values provided to transmit queue maximum depth may be of great importance and may be analyzed with care. When material differences in attribute values of message queue objects are found between successive environments, for example testing environments, these differences may warrant analysis and justification.

The configuration console 120 resolves discrepancies between message queue objects associated with the transitioning application 150 and the message queue manager configuration 170 of the baseline environment by generating the change list and investigating and resolving material differences. The change control data store 136 contains message queue manager configuration changes that have been approved by the appropriate level of management as well as changes that are awaiting approval. The changes may be coded and may reference to at least one application 150, 152, 154 under development and testing. When the configuration console 120 through its creation of the change list identifies discrepancies between message queue objects associated with a transitioning application 150 and the baseline environment or modified baseline environment from which the application 150 is originating, the configuration console 120 accesses the change control data store 136 to determine the approval status of change requests supporting the discrepancies. When a change request is found to have management approval, the configuration console 120 notes the discrepancy as approved. When a change request is found but is not approved, the application 150 may not be permitted to transition until the change request is approved or the application 150 may be permitted to transition but with the subject message queue object not containing the discovered modification. The same process may apply when a message queue object is found to be associated with the transitioning application 150 but a corresponding object is not found at all in the change control data store 136. This may indicate that the message queue object is new to the application 150 or was existing and renamed for some reason. The discovery of new message queue objects or the changing of the name of existing message queue objects causes the configuration console 120 to investigate for documentation and approval of these events in the change control data store 136.

The configuration console 120 may discover changes to message queue objects associated with transitioning applications 150, 152, 154 or insertions of new message queue objects wherein the changes are not documented and approved in the change control data store 136 and wherein the changes or insertions cannot be permitted to transition to the next environment. Unauthorized changes may be found to expose the structure of the message queue environment for the application 150 to too much risk of failure, expose security vulnerabilities, or consume excessive processing capacity, memory, or storage space, for example. Such unauthorized changes may have to be removed from message queue manager configurations 170, 172, 174 before their associated applications 150, 152, 154 may be transitioned to their destination environments. If it is discovered that a significant amount of development and/or testing activity and resulting actions were predicated on the inclusion of unauthorized changes to the message queue configuration 170 in the source environment, it may be necessary to delay transition of the application 150 until testing can be done in the source environment with the unauthorized changes removed or with the unauthorized change modified to be made acceptable. This process may enforce discipline on application development teams that may be under pressure to correct problems and make other changes in application builds.

The configuration console 120 may also query the target environment data store 134 in the database 130 for target-specific rules that apply to object definitions associated with the target or destination environment to which the application 150 is transitioning. While general adherence to the message queue structure of the baseline environment may be important to assure the integrity of objects that are transitioning in the flow from development to testing to production, the present disclosure teaches that requirements in the target or destination environment for a particular application transition may also need to be met. The target environment data store 134 may contain rules for message queue object specifications in the target environment and may contain rules that are specific to the application 150 transitioning to the target environment. The configuration console 120 may conduct a process similar to that used with a source baseline environment where it creates a list of object specifications for the application 150 undergoing transition and compares the list to any object specifications or requirements for the target or destination environment.

The configuration console 120 queries the target environment data store 134 for rules to be applied in the target environment for the development or testing that will take place there. Some of these rules may be applied to message queue object definitions and to associated monitoring thresholds. The configuration console 120 also queries the target environment data store 134 for application-specific and environment-specific rules such as the configuration of such settings as message queue channel user identifications, message batch size, maximum message size for message queue channels, and maximum queue depth. Some of these application-specific rules may be applied to a plurality of applications 150, 152, 154 that may undergo further development or testing in the target environment and some of the rules may apply to only the single transitioning application 150. The application-specific and environment-specific rules described in the target environment data store 134 support the correct placement and configuration of individual message queues and message queue channels in the target environment. The rules may support assurances that the message queue topology from one environment to the next environment is correct. Maintaining message queue manager correctness across a progression of development and testing environments may promote fidelity and accountability back to the baseline message queue environment upon which much of the application development is based.

While application-specific and environment-specific rules described in the target environment data store 134 may describe the placement and configuration of settings of message queue manager configurations 170, 172, 174 in specific environments, the settings may differ significantly depending on the development, testing, or other stage of the application 150. In an example, an application developer may use a variety of different values for alarming thresholds for transmit queue maximum depth depending on the stage of the application 150. In a development environment, the developer may not even activate this setting as this setting may not be relevant in this environment. In testing environments, the developer may configure this setting to be about 50 messages deep. In testing, training, and production, the developer may configure this setting at 2000 messages. For some applications 150, 152, 154, transmit queue maximum depth may be increased to 5000 messages. Some specific message queue managers such as a message queue hub component may be set at 10,000 messages. The developer may need transmit queues in each environment but the value of the maximum queue depth may be different in each environment and for each application 150 or instance of application 150.

The process described herein of comparing the message queue manager configuration 170 associated with the application 150 in transition with a baseline to determine message queue objects that may have changed in the source environment combined with compliance with application-specific and environment-specific rules for the target environment may take place at a plurality of stages. At each stage, the changes may be documented and baseline environments may be recorded that stage. Message queue object definitions may be updated, documented, and stored for use during deployments at later stages.

Application development may take place in a plurality of stages and testing may also comprise a sequence of stages. Testing and development may be intermingled. Operational readiness testing (ORT) may take place when release to production of the application 150 is imminent. The organization may test the application 150 in a plurality of release test bed (RTB) environments.

While the present disclosure has described the transition of applications 150, 152, 154 across a progression of development and testing environments, the system and methods taught herein also provide for horizontal transition of applications 150, 152, 154 at a single stage of development or testing. The organization may, for example, be testing eight instances of the application 150 and may wish to create eight additional instances for various additional testing wherein the additional instances will be peer or parallel instances of the original eight instances. The organization may wish to maintain integrity of message queue environments as it creates eight additional instances as peers of the original eight instances. The organization may wish to run the eight additional instances in parallel to the original eight instances and have the sixteen total instances be synchronized with each other as a group. The organization may transition the application 150 to each of the additional eight peer instances in manners similar to those taught herein for transitioning the application 150 along a sequential progression of development and testing stages. The console 120 may compare message queue objects in the application 150 with message queue objects associated with the original baseline configuration or a baseline configuration modified and approved for use at the particular stage of testing in this example. Variances in the dates and other information associated with message queue objects in the application 150 from the information associated with the corresponding message queue objects in the baseline are identified, investigated, and resolved as described previously. The configuration console 120 also accesses the target environment data store 134 to find application-specific and target-specific settings that may need to be applied to the application 150 and the particular message queue manager configuration 170 in the destination environment.

Transitioning of the application 150 to at least one additional peer instances does not comprise cloning or creating a copy of the source environment from which the application 150 is transitioning. Because the destination environment may be at the same stage of development or testing as the source environment does not mean that unauthorized message queue changes or message queue configuration defects would not be transitioned over to the destination environment. The same steps to achieve integrity in message queue configuration across successive environments may be applied to applications 150, 152, 154 being transitioned to peer or parallel environments.

In an embodiment, a single development, test, or other environment may comprise a plurality of message queue manager configurations 170, 172, 174, each message queue manager configuration 170, 172, 174 being associated with a different application 150, 152, 154, respectively. The message queue manager configuration 170 and the respective application 150, for example, with which it is associated in the environment, may be unrelated to another message queue manager configuration 172 and its associated respective application 152, both of which may be unrelated to a third message queue manager configuration 174 and its associated respective application 154. The three applications 150, 152, 154 in the single environment may be executing different and entirely unrelated tasks, drawing on different data stores and/or backend applications 180, 182, 184, and handling different and unrelated processing loads.

The network 192 promotes communication between the components of the system 100. The network 192 may be any communication network including a public data network (PDN), a public switched telephone network (PSTN), a private network, and/or a combination.

Figure 2A:
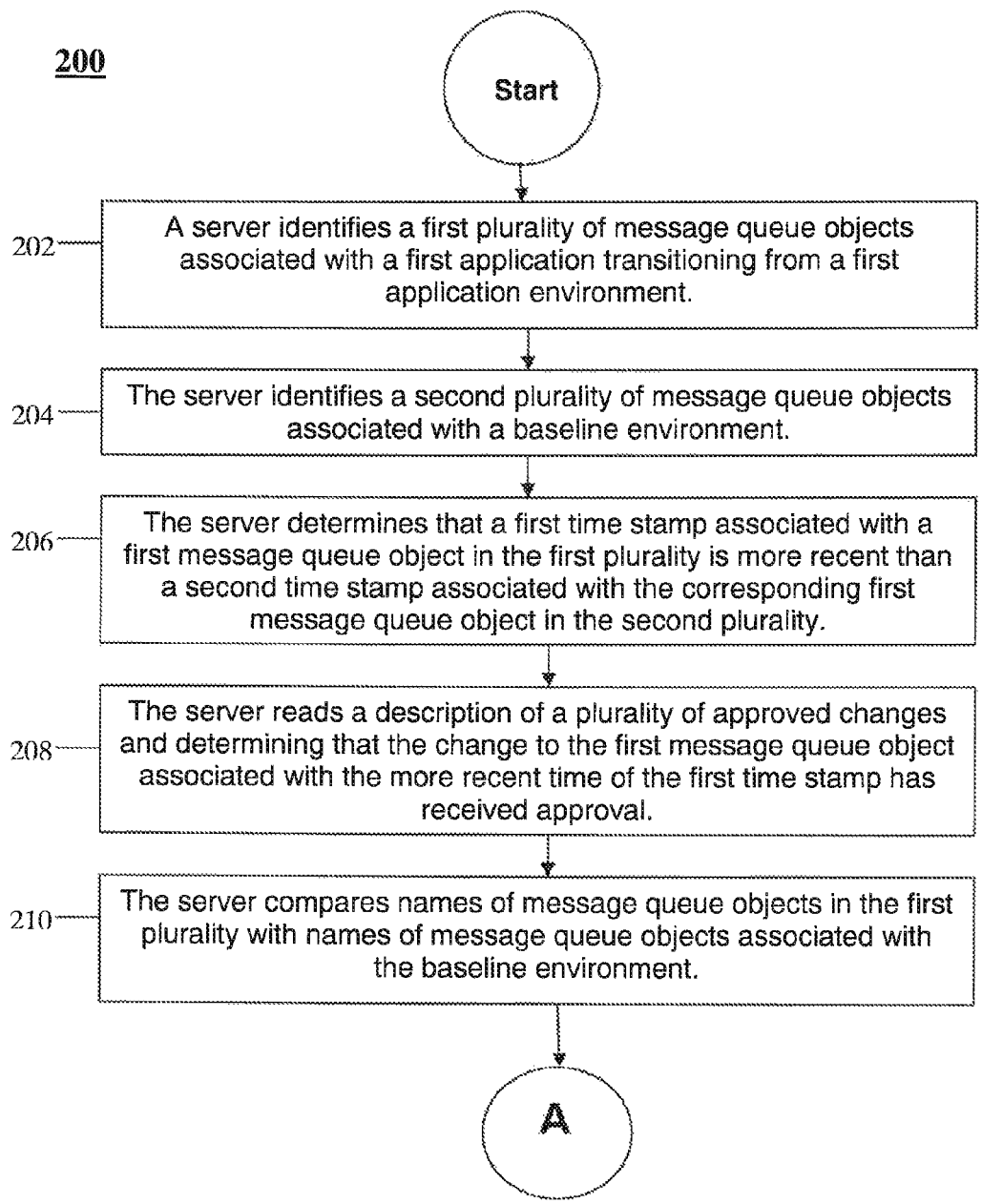
FIG. 2*a* is a flow chart illustrating a method according to an embodiment of the disclosure.
Figure 2B:
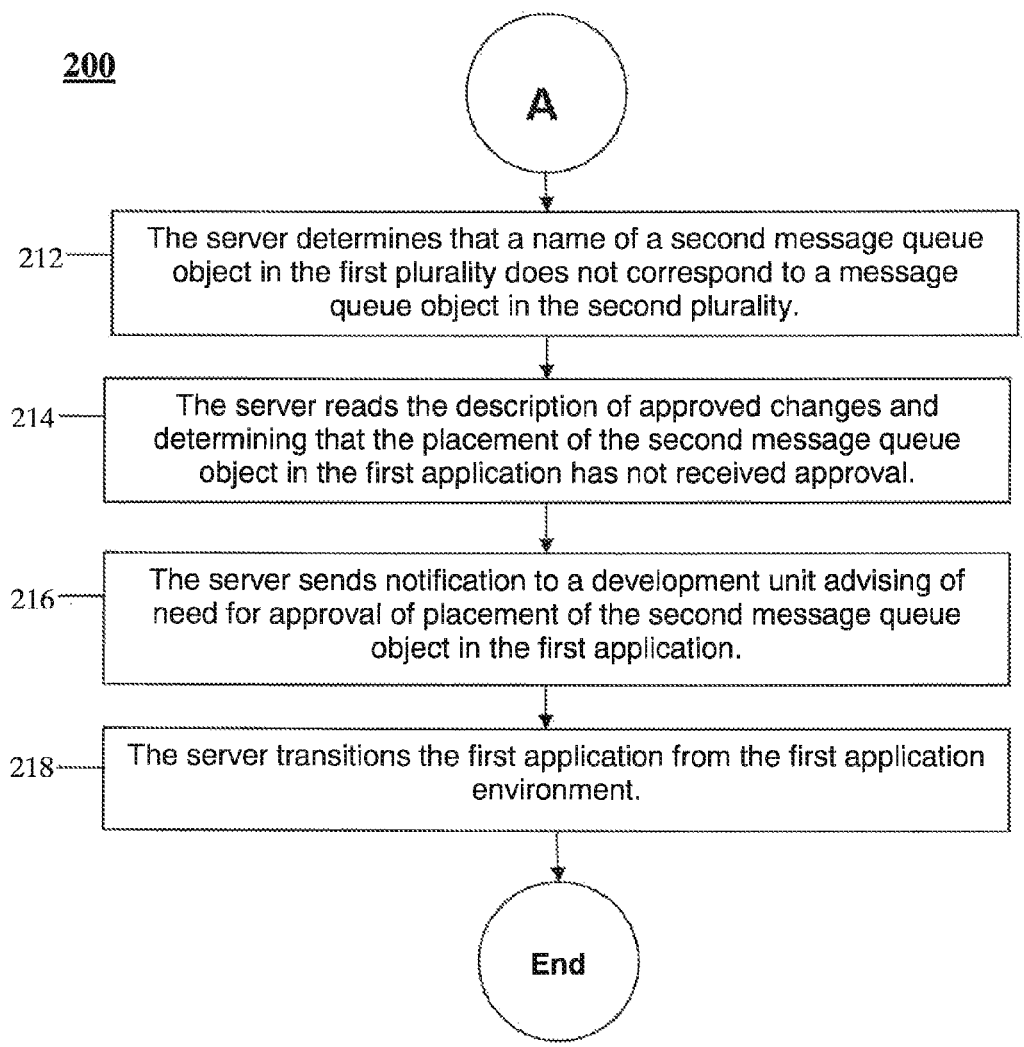
FIG. 2*b* is a flow chart illustrating a method according to an embodiment of the disclosure.

Turning now to FIG. 2a and FIG. 2b, a processor-implemented method 200 is described. Beginning at block 202, a server identifies a first plurality of message queue objects associated with a first application transitioning from a first application environment. At block 204, the server identifies a second plurality of message queue objects associated with a baseline environment.

At block 206, the server determines that a first time stamp associated with a first message queue object in the first plurality is more recent than a second time stamp associated with the corresponding first message queue object in the second plurality. At block 208, the server reads a description of a plurality of approved changes and determines that the change to the first message queue object associated with the more recent time of the first time stamp has received approval.

At block 210, the server compares names of message queue objects in the first plurality with names of message queue objects associated with the baseline environment. At block 212, the server determines that a name of a second message queue object in the first plurality does not correspond to a message queue object in the second plurality.

At block 214, the server reads the descriptions of approved changes and determines that the placement of the second message queue object in the first application has not received approval. At block 216, the server sends notification to a development unit advising of need for approval of placement of the second message queue object in the first application. At block 218, the server transitions the first application from the first application environment.

Figure 3:
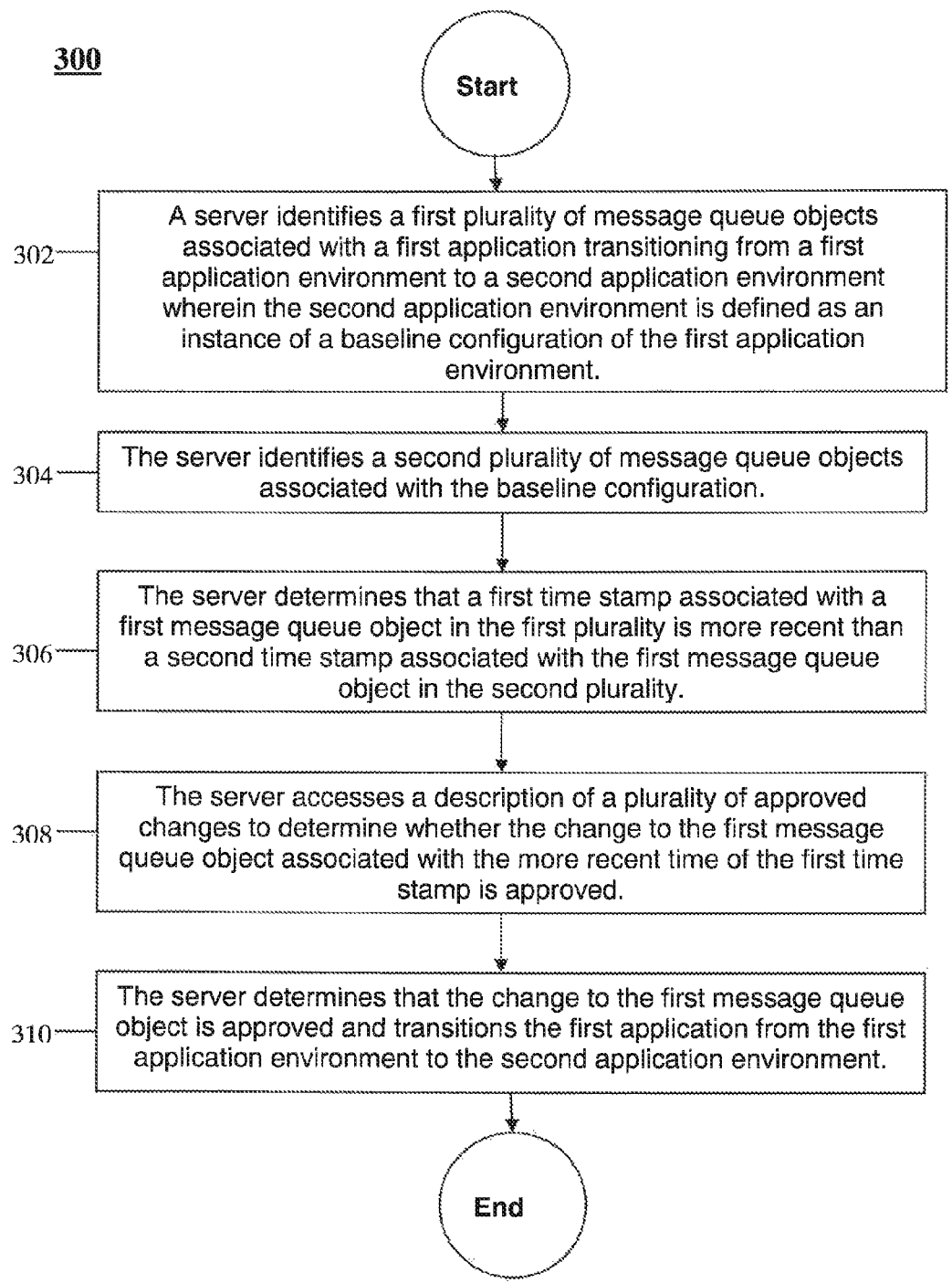
FIG. 3 is a flow chart illustrating a method according to an embodiment of the disclosure.

Turning now to FIG. 3, a processor-implemented method 300 is described. Beginning at block 302, a server identifies a first plurality of message queue objects associated with a first application transitioning from a first application environment to a second application environment wherein the second application environment is defined as an instance of a baseline configuration of the first application environment. At block 304, the server identifies a second plurality of message queue objects associated with the baseline configuration.

At block 306, the server determines that a first time stamp associated with a first message queue object in the first plurality is more recent than a second time stamp associated with the first message queue object in the second plurality. At block 308, the server accesses a description of a plurality of approved changes to determine whether the change to the first message queue object associated with the more recent time of the first time stamp is approved. At block 310, the server determines that the change to the first message queue object is approved and transitions the first application from the first application environment to the second application environment.

Figure 4A:
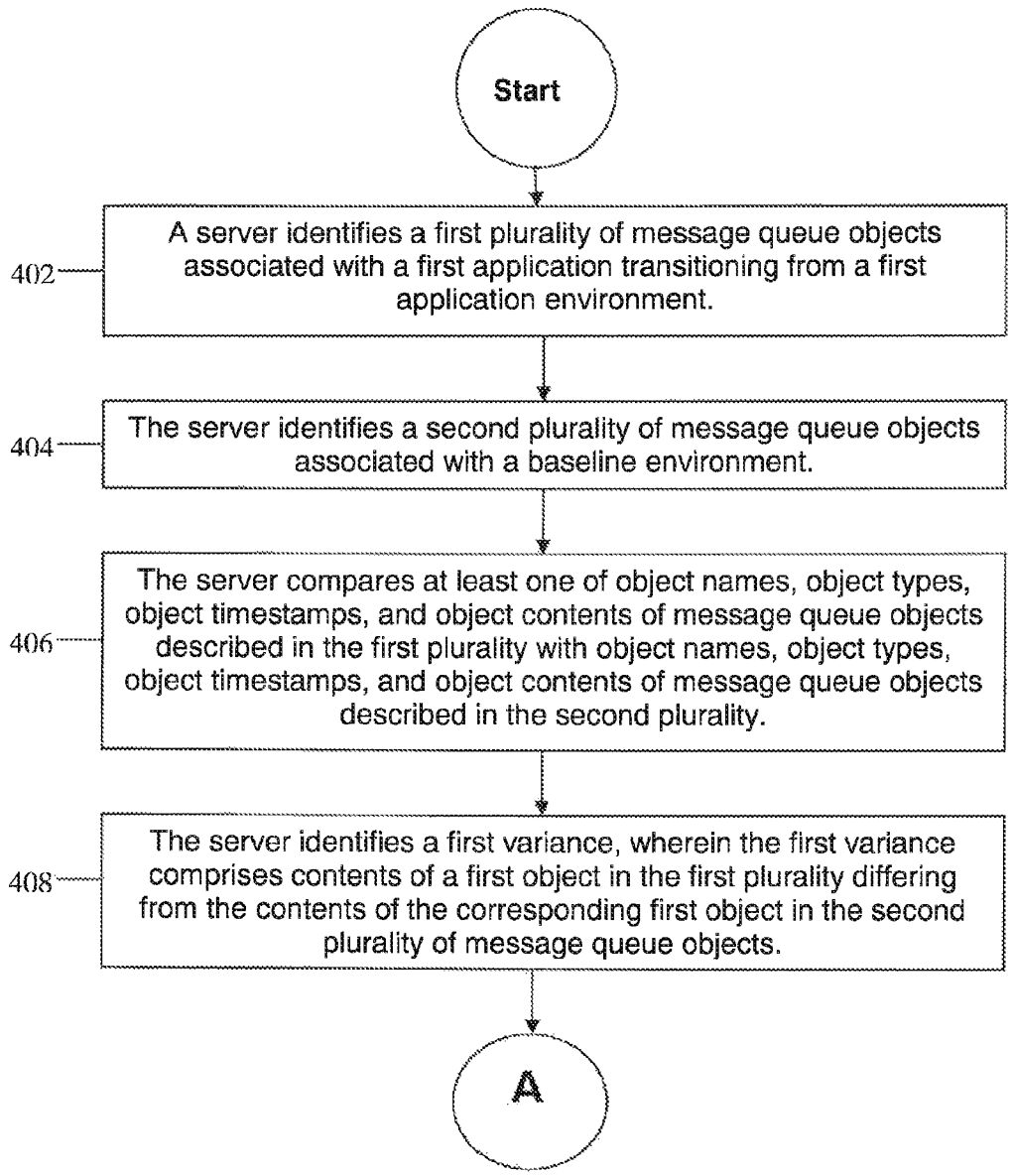
FIG. 4*a* is a flow chart illustrating a method according to an embodiment of the disclosure.
Figure 4B:
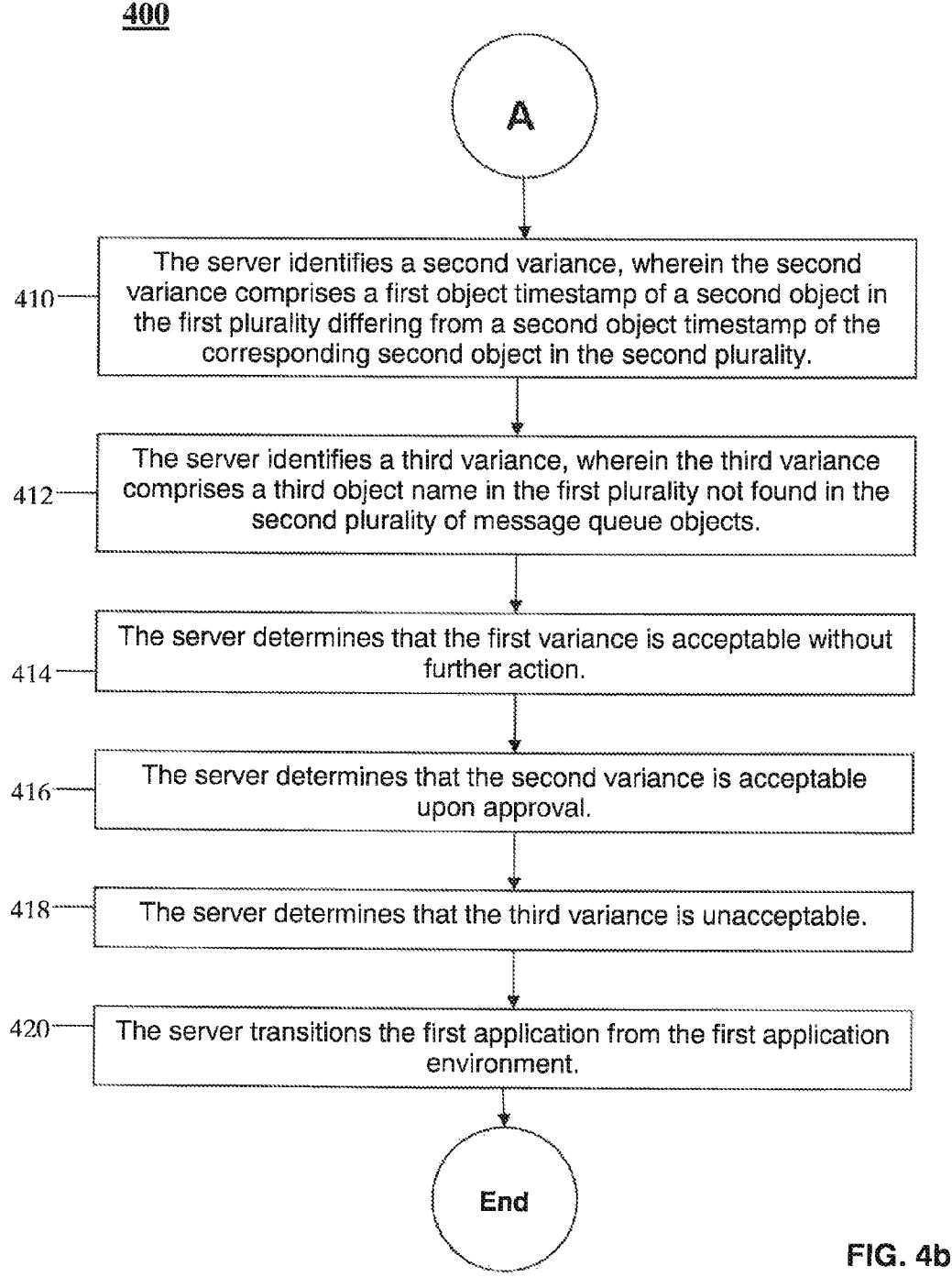
FIG. 4*b* is a flow chart illustrating a method according to an embodiment of the disclosure.

Turning now to FIG. 4a and FIG. 4b, a processor-implemented method 400 is described. The method 400 is associated with a first application transitioning from one message queue environment to a subsequent message queue environment. Before the first application is permitted to transition to the destination environment, the method 400 examines the message queue objects associated with the transitioning first application. A server, that may be the configuration server 110 described in the system 100, compares attributes and characteristics of message queue objects associated with the transitioning application with objects in a predefined baseline environment for a software development project for the first application. The method 400 seeks to assure that the message queue objects are the same as in the baseline environment with any differences accounted for. If they are not the same, the method 400 seeks to resolve or otherwise account for the differences. This may comprise determining that a change to one or more message queue objects has already been approved, determining that a change has not been approved but is in process of review, determining that a change is acceptable because it falls within predetermined acceptable limits, determining that a change has not been approved and cannot be accepted, or determining that a change has some other status. Depending on the determination made, the server takes various actions with respect to allowing the first application to transition to the intended destination message queue environment.

The method 400 describes a comparison of characteristics of objects associated with the message queue environment from which the first application is originating with characteristics of the corresponding message queue objects in the baseline configuration. A first message queue object, for example, associated with the transitioning first application may be identical to a corresponding first message queue object in the baseline configuration. The server compares characteristics and attributes of versions of the first message queue object associated with the first application and in the baseline. The server examines the names of objects, their types, their contents, their current timestamps, and other attributes and characteristics. When differences are found between the two versions of an object, when an object is found associated with the first application but not in the baseline, or when an object in the baseline does not have a corresponding object associated with the first application, the server investigates and analyses these discrepancies to determine any associated approval status.

Depending on the approval status or other circumstances or conditions associated with a change or other discrepancy discovered, the server may allow the change to be included in the destination message queue environment. In some cases, the server may delay or disallow the transitioning of the first application from its originating environment to an intended destination environment.

Beginning at block 402, the server identifies a first plurality of message queue objects associated with the first application transitioning from a first application environment. Some of the first plurality of message queue objects may not have changed, others may have changed, and others may be entirely new. At block 404, the server identifies a second plurality of message queue objects associated with a baseline environment. The second plurality of message queue objects may be known, tested, and approved components. The baseline comprises a control group of message queue objects to which object changes made in development, testing, and other environments resolve back to.

At block 406, the server compares at least one of object names, object types, object timestamps, and object contents of message queue objects described in the first plurality of message queue objects with object names, object types, object timestamps, and object contents of message queue objects described in the second plurality of message queue objects. The server is determining differences between message queue objects associated with the transitioning first application and those associated with the baseline environment.

At block 408, the server identifies a first variance, wherein the first variance comprises contents of a first object in the first plurality of message queue objects differing from the contents of the corresponding first object in the second plurality of message queue objects. An object associated with the transitioning first application is discovered to differ from the corresponding object in the baseline environment in terms of contents of the two versions of the object. The two versions of the object may, for example, have coding differences.

At block 410, the server identifies a second variance, wherein the second variance comprises a first object timestamp of a second object in the first plurality differing from a second object timestamp of the corresponding second object in the second plurality. At this step, the date and time of an object associated with the transitioning first application is found to differ from the date and time of the corresponding object in the baseline environment. This suggests that there may be other differences between the two instances of the object. The server investigates these differences and attempts to discover documented resolutions of these differences.

At block 412, the server identifies a third variance, wherein the third variance comprises a third object name in the first plurality of message queue objects not found in the second plurality of message queue objects. At this step, the server discovers that an object associated with the transitioning first application does not correspond to a message queue object in the baseline environment. This suggests that the discovered object was newly introduced into the message queue environment from which the transitioning first application is originating.

At block 414, the server determines that the first variance is acceptable without further action. The first variance may be acceptable because the differences between the two versions described at block 408 are determined to fall within a predetermined acceptable range. A range of approved differences or variances may have previously been established. The present disclosure also teaches that some differences between versions of message queue objects are not material.

At block 416, the server determines that the second variance is acceptable upon approval. The server may determine from examination of documentation in a change control system, for example the change control data store 136, that the second variance, that involves a timestamp difference between the two versions of a message queue object, is associated with a change that is pending approval. In an embodiment, the underlying action that led to the difference in object timestamps may be viewed as routine with pending approval assured.

At block 418, the server determines that the third variance is unacceptable. At block 412, the server discovered the third variance arising from a message queue object associated with the transitioning first application not corresponding to a message queue object in the baseline. After investigation the server determines that the discovered message queue object was introduced into the environment of the first application and did not have proper approval. The server may have determined that approval for the message queue object cannot be secured and that the presence of the object in future message queue environments may be potentially harmful or disruptive to the overall development project. At block 418, the server disallows the inclusion of the object with the first application as it transitions message queue environments.

At block 420, the server transitions the first application from the first application environment. The first application is transitioned with changes associated with the first variance and the second variance in place, assuming that approval for the second variance is secured. The change associated with the third variance, the introduction of the new message queue object, is not allowed, and the first application is transitioned with the new message queue object removed. In an embodiment, the transitioning of the first application may be delayed until the third variance is resolved wherein approval for inclusion of the new object is secured.

If the transition of the first application goes forward without resolution of the third variance, the server may send advice to the unit associated with the transitioning first application about further development and testing of the disallowed object associated with the third variance. The advice may be associated with determining and managing risks associated with the object that may call for recoding the object, for example. In an embodiment, if the unit makes adjustments and receives approval, the disallowed object may be permitted for inclusion in future message queue object configurations. Such approval would be documented in the change control data store 136.

Figure 5:
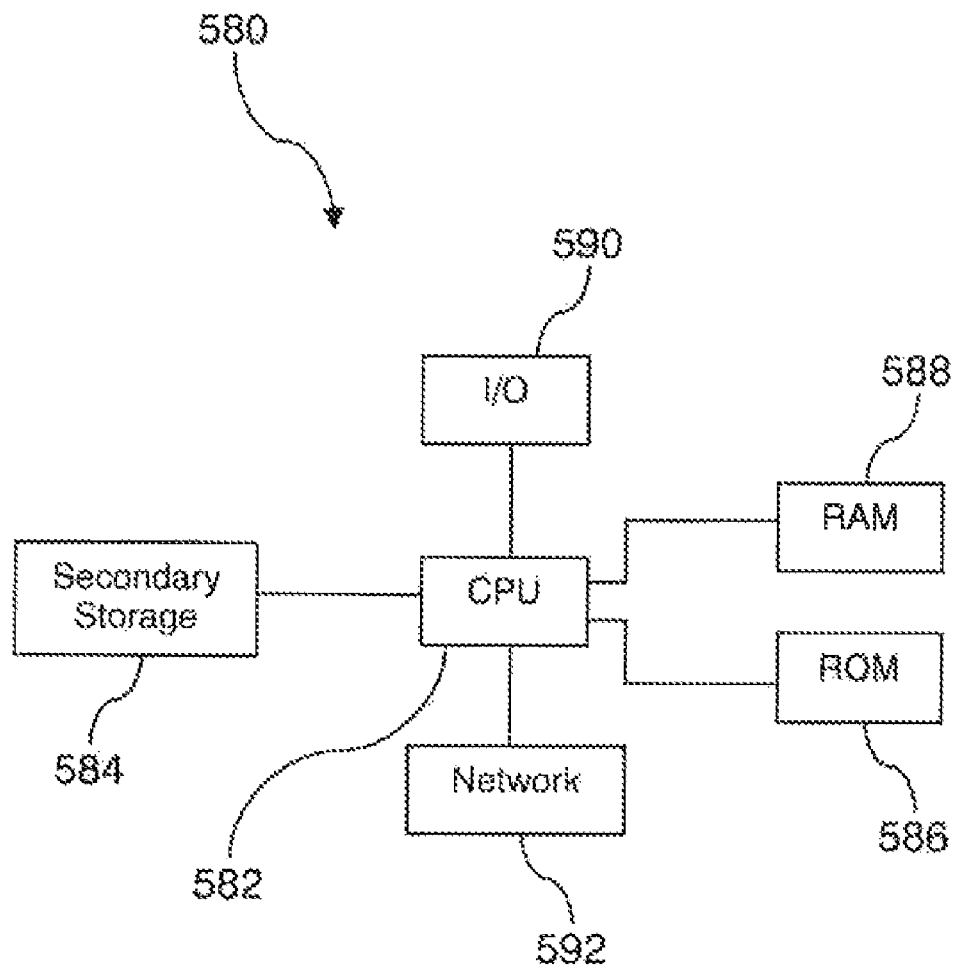
FIG. 5 illustrates an exemplary computer system suitable for implementing some aspects of the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation.

Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as non-transitory storage and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data in part by directly accessing the computer program product, for example by reading from a CD-ROM disk inserted into a disk drive peripheral of the computer system 580. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method comprising:
a server identifying a first plurality of message queue objects associated with a first application transitioning from a first application environment;
the server identifying a second plurality of message queue objects associated with a baseline environment;
the server determining that a first time stamp associated with a first message queue object in the first plurality is more recent than a second time stamp associated with the corresponding first message queue object in the second plurality;
the server reading a description of a plurality of approved changes and determining that the change to the first message queue object associated with the more recent time of the first time stamp has received approval;
the server comparing names of message queue objects in the first plurality with names of message queue objects associated with the baseline environment;
the server determining that a name of a second message queue object in the first plurality does not correspond to a message queue object in the second plurality;
the server reading the description of approved changes and determining that the placement of the second message queue object in the first application has not received approval;
the server sending notification to a development unit advising of need for approval of placement of the second message queue object in the first application; and
the server transitioning the first application from the first application environment.

2. The method of claim 1, wherein the server transitions the first application from the first application environment with the first application excluding the second message queue object.

3. The method of claim 1, wherein the server alternatively receives approval for placement of the second message queue object in the first application and transitions the first application from the first application environment with the first application including the second message queue object.

4. The method of claim 1, wherein the first application environment is one of a development environment and a test environment.

5. The method of claim 1, wherein an application environment transitions from a development environment to a test environment to a production environment.

6. The method of claim 1, wherein the message queue objects comprise maximum queue depth, queue depth, message batch size, and path names.

7. The method of claim 1, further comprising the first application transitioning to a second application environment wherein the second application environment is associated with target-specific rules and application-specific rules.

8. The method of claim 1, wherein the server accesses a change control system to view the description of approved changes.

9. The method of claim 1, wherein application environments additionally comprise training environments and post production break-fix environments.

10. A processor-implemented method, comprising:
a server identifying a first plurality of message queue objects associated with a first application transitioning from a first application environment to a second application environment wherein the second application environment is defined as an instance of a baseline configuration of the first application environment;
the server identifying a second plurality of message queue objects associated with the baseline configuration;
the server determining that a first time stamp associated with a first message queue object in the first plurality is more recent than a second time stamp associated with the first message queue object in the second plurality;
the server accessing a description of a plurality of approved changes to determine whether the change to the first message queue object associated with the more recent time of the first time stamp is approved; and
the server determining that the change to the first message queue object is approved and transitioning the first application from the first application environment to the second application environment.

11. The method of claim 10, wherein the first application environment and the second application environment are one of parallel application development environments and parallel application test environments.

12. The method of claim 11, wherein an instantiation of the first application is transitioned to the second application environment and wherein the first application remains executing in the first application environment and the instantiation of the first application executes in the second application environment.

13. The method of claim 10, wherein message queue objects associated with the first message queue configuration and the second message queue configuration comprise measures of maximum message queue depth.

14. The method of claim 10, further comprising the server accessing a change control system to locate the description of approved changes.

15. A processor-implemented method comprising:
a server identifying a first plurality of message queue objects associated with a first application transitioning from a first application environment;

the server identifying a second plurality of message queue objects associated with a baseline environment;

the server comparing at least one of object names, object types, object timestamps, and object contents of message queue objects described in the first plurality with object names, object types, object timestamps, and object contents of message queue objects described in the second plurality;

the server identifying a first variance, wherein the first variance comprises contents of a first object in the first plurality differing from the contents of the corresponding first object in the second plurality;

the server identifying a second variance, wherein the second variance comprises a first object timestamp of a second object in the first plurality differing from a second object timestamp of the corresponding second object in the second plurality;

the server identifying a third variance, wherein the third variance comprises a third object name in the first plurality not found in the second plurality;

the server determining that the first variance is acceptable without further action;

the server determining that the second variance is acceptable upon approval;

the server determining that the third variance is unacceptable; and the server transitioning the first application from the first application environment.

16. The method of claim 15, wherein the server determines the first variance to be acceptable based on the difference in contents of the first object described in the first plurality from the contents of the corresponding first object described in the second plurality falling within a predetermined acceptable range.

17. The method of claim 15, wherein the server accesses a change control system to determine approval of the second variance.

18. The method of claim 17, wherein when the server determines from the change control system that the second variance is not approved, the server sends a notification to a unit responsible for the second variance requesting approval.

19. The method of claim 15, wherein upon determination that the third variance is unacceptable, the system determines origin of the third variance and sends advice regarding testing of the first application environment for risks associated with the third variance.

20. The method of claim 19, wherein the server approves transition of the first application after approval is received for the second variance and after a third object associated with the third object name is one of corrected and withdrawn from the first application.

* * * * *